United States Patent
Reinbold et al.

(10) Patent No.: US 9,965,931 B2
(45) Date of Patent: May 8, 2018

(54) SYSTEMS AND METHODS FOR INTERFACING WITH AN AIRCRAFT CABIN CONTROL SYSTEM

(71) Applicant: THE BOEING COMPANY, Chicago, IL (US)

(72) Inventors: Michael Gary Reinbold, Everett, WA (US); Roland Louis Schafer, Jr., Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days. days.

(21) Appl. No.: 15/265,316

(22) Filed: Sep. 14, 2016

(65) Prior Publication Data

US 2018/0075717 A1     Mar. 15, 2018

(51) Int. Cl.
| | |
|---|---|
| G08B 7/00 | (2006.01) |
| H04B 1/3827 | (2015.01) |
| H04L 29/08 | (2006.01) |
| H04B 1/38 | (2015.01) |
| H04L 29/12 | (2006.01) |
| H04M 1/725 | (2006.01) |
| B64D 11/06 | (2006.01) |

(52) U.S. Cl.
CPC .............. *G08B 7/00* (2013.01); *H04B 1/3833* (2013.01); *H04L 67/12* (2013.01); *B64D 11/06* (2013.01); *H04L 61/2007* (2013.01); *H04M 1/72527* (2013.01)

(58) Field of Classification Search
CPC .......... G08B 7/00; H04B 1/3833; H04L 67/12
USPC ....................................................... 340/945
See application file for complete search history.

(56) References Cited

U.S. PATENT DOCUMENTS

| | | | |
|---|---|---|---|
| 7,962,259 B2 | 6/2011 | Schafer, Jr. et al. | |
| 8,166,506 B2 | 4/2012 | Callahan et al. | |
| 8,401,742 B2 | 3/2013 | Schliwa et al. | |
| 8,489,276 B2 | 7/2013 | Callahan et al. | |
| 9,118,973 B1 | 8/2015 | Derderian et al. | |
| 9,380,428 B1* | 6/2016 | Dame ................... | H04W 4/023 |
| 2008/0020703 A1 | 1/2008 | Harshaw | |
| 2012/0178359 A1* | 7/2012 | Sim ..................... | B64D 11/0015 |
| | | | 455/3.06 |
| 2012/0233645 A1* | 9/2012 | Royster .............. | H04N 21/2146 |
| | | | 725/76 |

(Continued)

FOREIGN PATENT DOCUMENTS

WO     2014209135 A1     12/2014

OTHER PUBLICATIONS

Extended European Search Report for Application No. 17185146.2 dated Oct. 26, 2017, 13 pgs.

*Primary Examiner* — Omar Casillashernandez
(74) *Attorney, Agent, or Firm* — Toler Law Group, PC

(57) ABSTRACT

Systems and methods for interfacing with an aircraft cabin control system are provided. One system includes a controller configured to control cabin services associated with one or more passengers, a portable electronic device configured to wirelessly connect to the controller and a seat location identifier associated with a seat of one passenger of the passengers. The system further includes an application on the portable electronic device that interfaces with the controller when the portable electronic device is wirelessly connected to the controller, wherein the application controls the cabin services associated with the seat of the one passenger.

20 Claims, 7 Drawing Sheets

(56) References Cited

U.S. PATENT DOCUMENTS

| | | | |
|---|---|---|---|
| 2013/0314257 A1 | 11/2013 | MacRae et al. | |
| 2013/0321435 A1* | 12/2013 | Stevens | G06F 3/00 345/522 |
| 2014/0094143 A1* | 4/2014 | Ayotte | G06Q 50/18 455/411 |
| 2014/0137164 A1* | 5/2014 | Yang | H04N 21/2146 725/76 |
| 2014/0242910 A1 | 8/2014 | Umlauft et al. | |
| 2014/0289306 A1 | 9/2014 | O'Sullivan et al. | |
| 2015/0017915 A1 | 1/2015 | Hennequin et al. | |
| 2015/0242765 A1* | 8/2015 | Muirhead | B64D 11/0015 705/5 |
| 2015/0251759 A1* | 9/2015 | Ibrahim | B64D 11/0015 244/118.5 |
| 2015/0373121 A1* | 12/2015 | Secilmis | H04L 67/12 455/41.2 |
| 2016/0059954 A1 | 3/2016 | Fagan et al. | |

* cited by examiner

SYSTEMS AND METHODS FOR INTERFACING WITH AN AIRCRAFT CABIN CONTROL SYSTEM

BACKGROUND

The present disclosure relates in general to controlling and connecting to cabin services within an aircraft, particularly passenger cabin services.

Passengers seated in airplanes may not be able to access controls for controlling passenger cabin services in certain situations. For example, a passenger seated in a wide body airplane where passenger cabin services (e.g., overhead lights) are too far away to reach from a seated position cannot control the passenger cabin services during certain portions of the flight (e.g., during takeoff, landing and when the fasten seat belt light is on). Moreover, even if the passenger is able to stand, it is more difficult and requires more effort to operate the passenger cabin services because the passenger must remove his or her seatbelt and then stand or uncomfortably partially stand to operate the passenger cabin services.

In order to make it easier for passengers to operate the passenger cabin services in certain airplanes, Reading Light/Call Light (RL/CL) switches may be installed in every passenger seat (instead of above the passenger seat). If the airplane has no other In Flight Entertainment (IFE) installed in the seats, then the switches are wired to a seat control box mounted in the seat group. Wires run from an In Flight Entertainment (IFE) Head End, located in one place in the airplane, to every seat or seat control box in the airplane. The IFE Head End forwards the digital switch commands across an airplane communication network to a Cabin Service System (CSS) Controller. A database, configured at the time the airplane seating layout is designed, maps the switch command from IFE to the correct light and corresponding CSS path, a combination of electrical ports and switches in boxes installed throughout the airplane overhead area. The signal eventually enables the power at the location of, for example, a reading light, for the light to turn on.

This implementation requires a large amount of wiring and equipment, and a complex sequence of hardware design and database definition. The wiring adds cost and weight to the airplane, and it is very inflexible. If the airline wants to change seat locations, all impacted wiring and equipment must be moved or redesigned, and the corresponding database changes must be coordinated between the airline and equipment manufacturers.

Thus, in conventional infrastructures, either it is difficult or impossible for a passenger to operate the passenger cabin services while in a seated position or implementing the connection infrastructure for controlling passenger cabin services from the seat is complex and adds weight to the plane.

SUMMARY

In one embodiment, a system is provided that includes a controller configured to control cabin services associated with one or more passengers, a portable electronic device configured to wirelessly connect to the controller and a seat location identifier associated with a seat of one passenger of the passengers. The system further includes an application on the portable electronic device that interfaces with the controller when the portable electronic device is wirelessly connected to the controller, wherein the application controls the cabin services associated with the seat of the one passenger.

In another embodiment, a cabin services interface for an aircraft is provided. The cabin services interface includes a controller configured to wirelessly interface a portable electronic device with a cabin service system (CSS) within the aircraft, wherein the controller is further configured to identify a location from which the portable electronic device transmitted a signal based on a unique identifier associated with a seat in the aircraft where the portable electronic device is located when transmitting the signal. The cabin services interface further includes a CSS signal generator configured to translate the signal transmitted by the portable electronic device to a CSS protocol to define a CSS protocol control signal. The cabin services interface also includes a CSS subsystem configured to convert the CSS protocol control signal to a CSS device control signal that enables control of one or more CSS devices located above the seat in the aircraft where the portable electronic device is located when transmitting the signal.

In another embodiment, a method for controlling cabin services in an aircraft is provided. The method includes providing a unique identifier for each seat in an aircraft that is displayed on a portion of each seat and allowing access to a cabin service system (CSS) within the aircraft from a portable electronic device based on a confirmation of the portable electronic device being located with a passenger in a seat of the aircraft, wherein one or more cabin services within the aircraft and associated with the seat are controllable from the portable electronic device.

DETAILED DESCRIPTION

Figure 1:
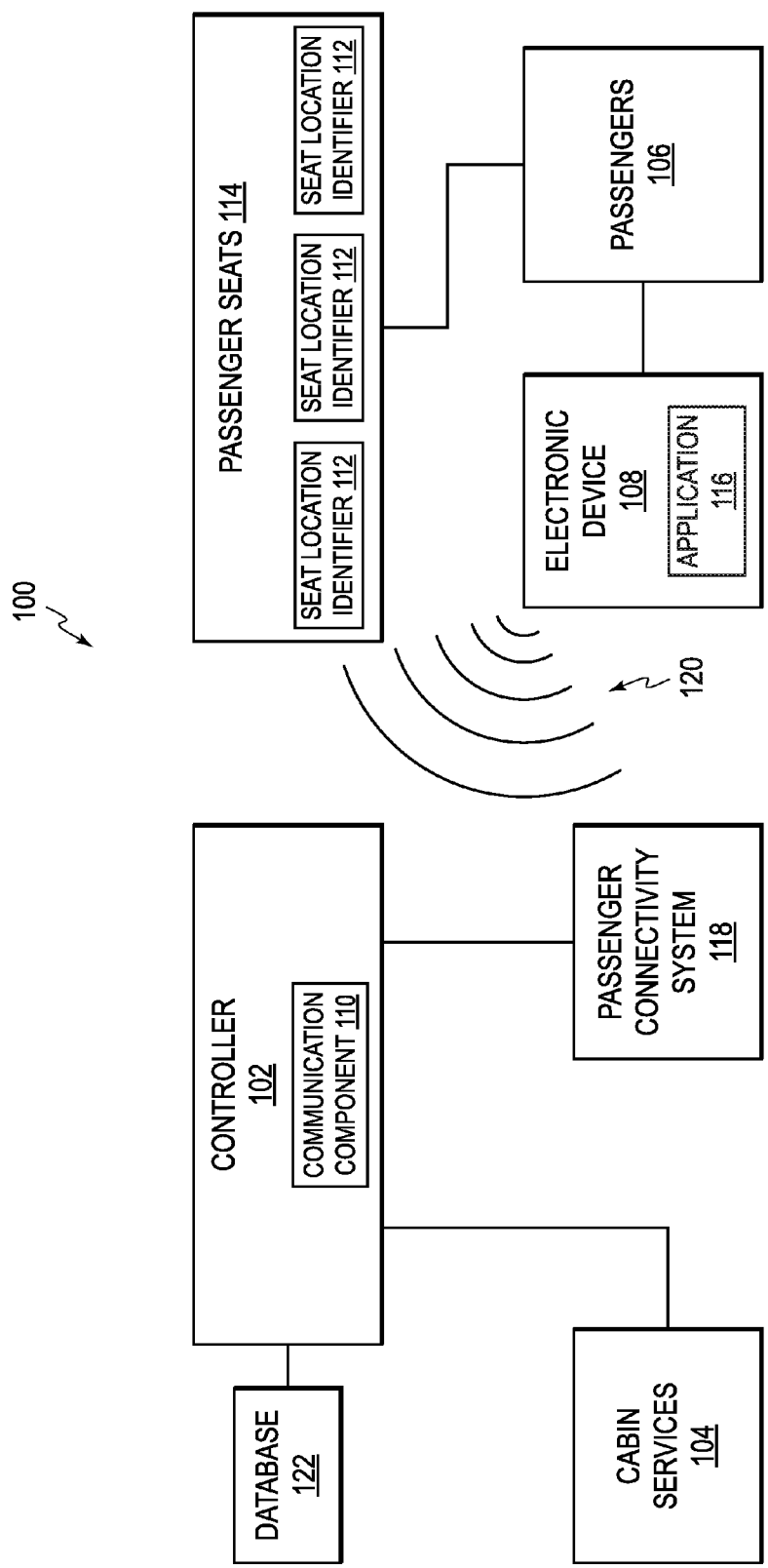
FIG. 1 is a block diagram illustrating a system to control cabin services in accordance with an embodiment.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks may be implemented in a single piece of hardware or multiple pieces of hardware. Similarly, the software programs may be stand-alone programs, may be incorporated as subroutines in an operating system, and the like. It should be understood that the various embodiments are not limited to the arrangements and instrumentality shown in the drawings.

Various embodiments provide systems and methods for interfacing with aircraft cabin services, such as controlling and connecting to passenger cabin services. More specifically, the systems and methods provide a remote interface between a personal electronic device (PED), also referred to as a portable electronic device, such as a cellular telephone or tablet device, among others, and passenger cabin services, including, but not limited to, passenger lights, call buttons and air vents. Thus, the systems and methods facilitate easier control of passenger cabin services by seated passengers that requires less hardware than a conventional system. For example, one or more embodiments allow remote control of passenger cabin services by a passenger using a handheld PED directly from a passenger seat in wide body airplanes or other environments where passenger cabin services (e.g., overhead lights) are too far away to reach from a seated position. However, it should be appreciated that various embodiments may be implemented in different non-aircraft environments to control cabin services, as well as in different aircraft, even if the passenger cabin services are reachable by a passenger in a seated position.

Various embodiments provide a connection arrangement to remotely control one or more passenger cabin services without individually wiring switches or multiplexers to each seat. Accordingly, one or more embodiments allow for easier reconfiguration and/or reduce the quantity of equipment required to be installed to perform FAA required functionality. Additionally, system and methods of one more embodiments eliminate the need for the in-flight entertainment (IFE) system, which is the second most expensive portion of the airplane in many types of airplanes.

In one embodiment, as illustrated in FIG. 1, a system 100 is provided that is configured to allow remote user interface to one or more services or passenger controllable functions on-board an airplane. The system 100 includes a controller 102 configured to control cabin services 104 associated with one or more passengers 106. For example, the controller 102 may be configured as an interface that allows the one more passengers to control one or more cabin services 104 remotely without physically activating a control input (e.g., a light switch). The cabin services 104 may include any services accessible and controllable by passengers 106 on-board the airplane, such as, but not limited to, passenger lights, call buttons, and/or air vents.

The system 100 further includes a device 108 configured to wirelessly communicate with the controller 102, which in the illustrated embodiment is an electronic device 108, such as a PED or other portable electronic device capable of wirelessly transmitting to and receiving from the controller 102. For example, the electronic device 108 may be a handheld electronic device, such as a smartphone or tablet device configured to communicate with the controller 102 via a communication component 110 (e.g., transceiver) of the controller 102.

The system 100 further includes seat location identifiers 112 associated with seats 114 of the passengers 106. For example, in some embodiments, a unique seat location identifier 112 is provided and corresponds to an individual passenger seat 114 in which the passenger 106 is seated with the electronic device 108. With this configuration, the controller 102 is able to identify the location of the passenger 106 requesting remote control of one or more cabin services 104 by correlating the unique seat location identifier 112 with a passenger seat 114 in which the passenger is seated.

The system 100 further includes an application 116 installed on the electronic device 108, which may be an electronic interface program that allows the electronic device 108 to communicate with the controller 102. For example, the application 116 may be a program installed on the electronic device 108 that allows the electronic device 108 to wirelessly connect to the controller 102 using defined communication protocols as described herein to thereby control one or more of the cabin services 104. The cabin services 104 that are controllable by the passenger 106 via the electronic device 108 may be limited or defined by the application 116 (e.g., an access level based on a user login or a time period based on a particular flight). By operating the application 116 on the electronic device 108, the passenger 106 is able to control one or more cabin services 104 associated with the passenger seat 114 of the passenger 106 while the passenger 106 is seated in the passenger seat 114 and without having to physically activate a control (e.g., button or switch) to operate the one or more cabin services 104. Thus, in various embodiments, the electronic device 108 is configured as a virtual control device that allows the passenger 106 to control the cabin services 104 without having to reach for physical controls within the aircraft and without the need for the aircraft to have hardwired controls to each of the passenger seats 114.

In operation, the system allows a user's device (e.g., the electronic device 108 of the passenger 106) to remotely connect to the controller 102 of the cabin services 104, which may include plural cabin service features. It should be noted that the system 100 in various embodiments allows remote connectivity to the controller 102, which may be embodied as, or form part of, a Cabin Service System (CSS) or the controller 102 may be installed near the passenger cabin service features, such as passenger lights, call buttons, and/or air vents. For example, in some embodiments, the CSS is an integrated cabin service system for a mobile platform, such as described in U.S. Pat. No. 7,962,259. As described therein, the system may include a controller in communication with a plurality of cabin services subsystems for controlling each of the subsystems. A database may be utilized by the CSS to employ combinational logic to control operation of the subsystems and to thus control the execution of at least one function of each of the subsystems.

In various embodiments, the connection of the user's device (e.g., the electronic device 108 of the passenger 106) to, for example the CSS of the controller 102, allows the passenger 106 to remotely control one or more desired cabin services, such as one or more functions or features (e.g., the correct light, call button, and vent associated with the passenger's seat), based on the seat location identifier 112, such as based on the passenger 106 scanning a code (e.g., a Quick Response (QR) Code) at his or her passenger seat 114, or by the passenger manually entering his or her seat number into a control interface (e.g., the application 116) on the passenger's electronic device 108. It should be appreciated that the mapping of the PED command to the correct seat may be performed using different arrangements as described herein. Thus, in addition to the passenger indicating which seat number he or she is in and desires to control corresponding passenger cabin services 104 or the passenger scanning a QR code (or other code) at the passenger seat 114, and the system 100 decoding the location from the QR code, other identification or locating configurations may be used, such as the system 100 automatically mapping the passenger identification (ID) to the passenger manifest such that the system knows in which passenger seat 114 the passenger 106 is seated (or should be seated).

With one or more of the systems and methods of various embodiments, such as the system 100, there is no need to install the RL/CL switches and associated wiring in the passenger seats 114. In some embodiments, if a passenger 106 desires to operate the RL/CL, the passenger 106 uses his or her own electronic device 108, such as the PED (e.g. smartphone) to download the application 116 from the airplane installed passenger connectivity system 118, or prior to the flight from another source (e.g., an app store, or the airline's web site). Thus, in operation, a passenger owned device (e.g. a smartphone) and the application 116 (e.g., an airline unique application) may be used to read a location tag and transmit a signal to an onboard receiver, such as the transceiver 110 of the controller 102, to enable one or more functions or features, including one or more cabin services, of the CSS (e.g., reading lights, call lights or air vent controls).

Figure 2:
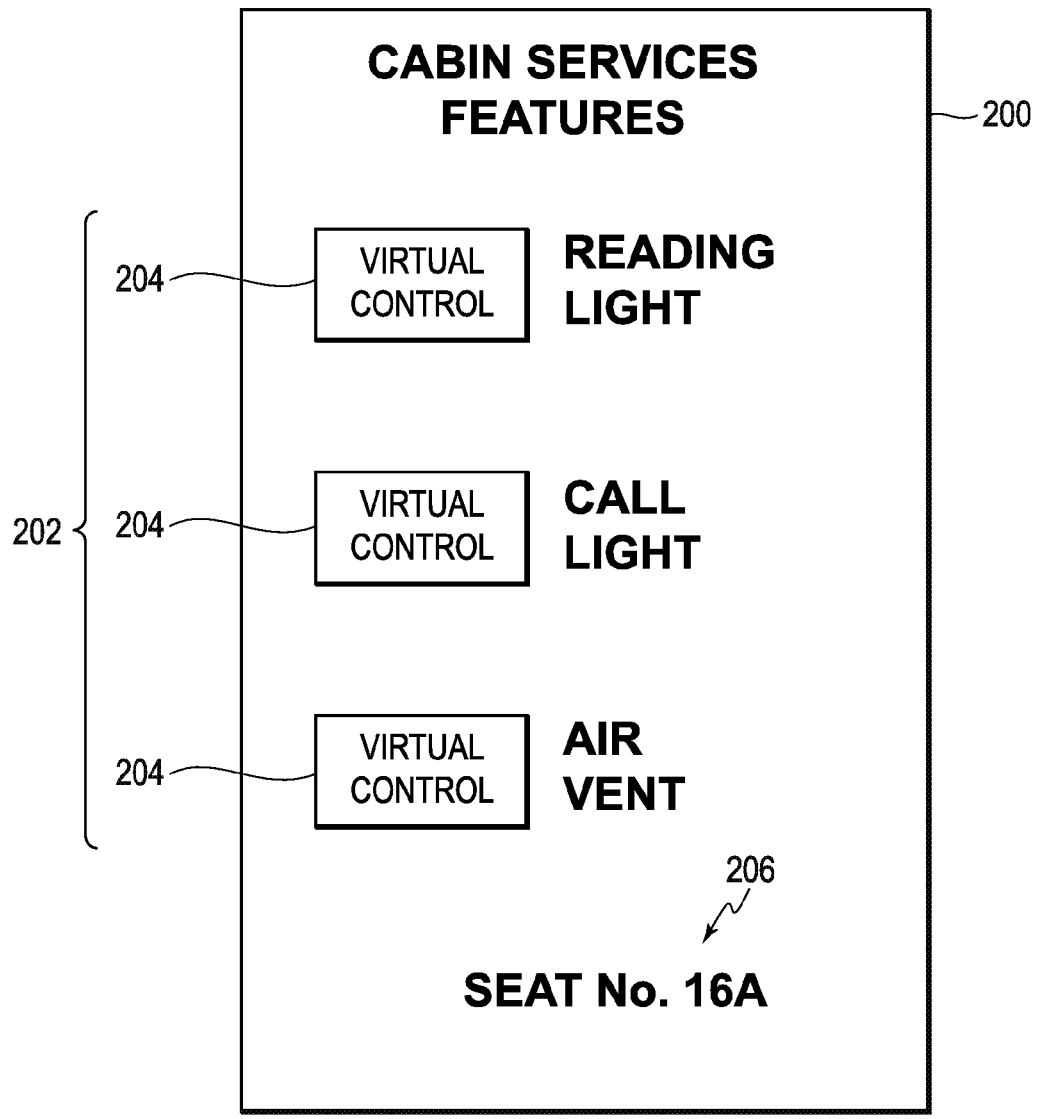
FIG. 2 is a diagram illustrating a user interface accordance with an embodiment.

For example, in some embodiments, a user interface 200 as illustrated in FIG. 2 may be provided on the electronic device 108 when the application 116 is installed thereon and is activated. As can be seen, the user interface 200 includes button command controls 202 to control a desired operation or function, which may be configured as virtual buttons or switches that may be controlled by the passenger 106 at his or her passenger seat 114. In operation, by activating one or more of the button command controls (e.g., by touching or sliding a corresponding virtual control 204), a control signal 120 (shown in FIG. 1) for a particular cabin service function is communicated to the controller 102. For example, in some embodiments, the control signal 120 is communicated through the passenger connectivity system 118 to the controller 102 (e.g., CSS controller) and then translated via a database 122 (shown in FIG. 1), using available on-board airplane systems as described herein. The translated command is then communicated via one or more communication paths or links as described herein in a communication protocol that allows for control of one or more of the cabin services 104. Thus, in various embodiments, remote control functionality of cabin services 104 may be performed using broadband connectivity infrastructure on-board the airplane in which logical to physical determinations are solved as discussed herein.

In other embodiments, for example when controlling lighting operation, the button command initiated by activation of the virtual control 204 can be received directly by a lighting controller installed in the vicinity of the light(s), and the appropriate or corresponding light is turned on as a result of a remote command from the passenger's PED.

As should be appreciated, many different operations and functions within the cabin of the airplane may be controlled using various embodiments. For example, a passenger 106 can control the fresh air vent ("gasper" flow) or local air temperature using the same application 116 on the passenger's PED. Thus, the functions illustrated as being controllable by the user interface 200 are for illustration only. It also should be noted that the user interface 200 may also provide additional information for confirmation or input by the passenger 106, such as the seat number 206 in which the passenger 106 is seated.

A CSS interface system 300 will now be described in connection with FIG. 3 (with additional reference to FIGS. 1 and 2). The CSS interface system 300 includes a control signal generator, illustrated as a CSS signal generator 302, a user interface 304 (which may be embodied as the user interface 200), a database 306, a system controller 308, and a CSS subsystem 310. It should be noted that the CSS subsystem 310 may be embodied as one or more different systems on-board an aircraft that provide different cabin services 104.

Figure 4:
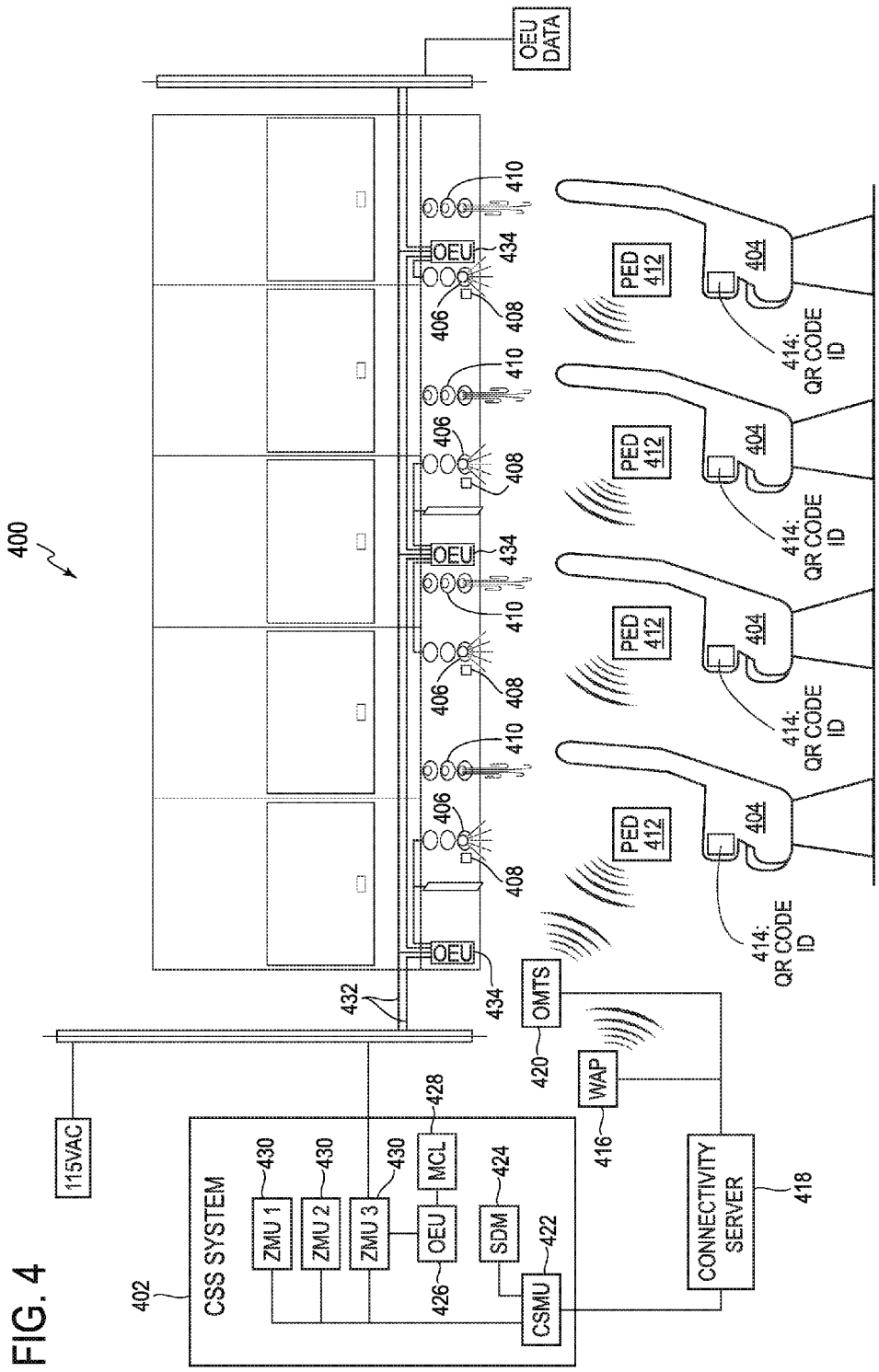
FIG. 4 is a block diagram of a control arrangement in accordance with an embodiment.

The CSS subsystem 310 in the illustrated embodiment includes a CSS controller 312, which may form part of or be embodied as a CSS system 402 (shown in FIG. 4). It should be noted that multiple CSS subsystems 310 and/or multiple CSS controllers 312 may be provided, such as to control CSS functionality in different portions of the aircraft. The CSS subsystem 310 is configured to control one or more CSS devices 314, which in various embodiments provide the cabin services 104. For example, the CSS subsystem 310 in some embodiments operates to control one or more cabin services 104 from the user's electronic device 108 by accessing the user interface 304. In some embodiments, the user interface 304 may be configured for operation in connection with a particular aircraft or particular type of aircraft, which may have a corresponding application 116 that can be installed on the user's electronic device 108. The application 116 then allows the user to communicate with the system controller 308 to thereby control one or more cabin services 104, which may be provided by the CSS devices 314.

The CSS signal generator 302 accesses data from the database 306 that allows for generation of control signals to control the CSS devices 314 based on user inputs received by the user interface 304. For example, user commands to control one or more cabin services 104 are received by the CSS interface system 300 and used by the CSS signal generator 302 to generate CSS control signals to control the CSS devices 314. In some embodiments, the database 306 includes command conversion or translation tables that can be accessed to convert or translate received user commands from the user interface 304 to CSS commands that control the operation of the CSS devices 314.

The command conversion or translation tables may be specified, for example, by an Interface Control Document that allows for the CSS signal generator 302 to generate appropriate data bit patterns in a bit flow that is transmitted to the CSS subsystem 310. The CSS controller 312, which in some embodiments is configured or embodied as an overhead electronic unit within the aircraft, converts the digital signal flow or stream (e.g., digital control messages) to analog control signals that operate the CSS devices 314 (e.g., turn on an overhead light). Thus, the signals received from the user interface 304 are converted or translated to digital control signals (e.g., CSS control protocol signals), which are then converted to analog signals to control cabin services 104 available from the CSS devices 314.

In various embodiments, the database 306 is a comprehensive database that is software loadable and utilized by the entire CSS. The database 306 may be populated with various types of data that can be implemented or operated during the execution of combinational logic. For example, the database 306 can include such data as numerical data (data), logic statements (LS) and/or expressions (EXP), e.g. state programs, algorithms and equations. The database 306 allows the CSS interface system 300 to define the physical control and usage of each input and output of the various controls, such as for controlling the cabin services 104 available by operating the CSS devices 314, including the logical affect that each input has on the CSS subsystem 310.

The database 306 provides the conversion and/or translation information to generate the CSS signals and to map the CSS signals (CSS inputs) via logical expressions or mathematical combinations of state(s) to apply the appropriate transaction for the required output(s) that define the functionality of the CSS devices 314. In various embodiments, the CSS signal generator 302 generates the CSS control signals, such that the CSS controller 312 incorporates combinational logic to control that state of the various functions of the CSS devices 314. Thus, the functionality of the CSS devices 314 (e.g., the cabin services 104) can be controlled remotely by the electronic device 108 using data programmed into the database 306. It should be noted that the data programmed into the database 306 may be changed as desired or needed, for example to control different CSS devices 314 or cabin services 104.

In one embodiment, the contents of the database 306 are downloaded during initiation of a control session or pre-flight routine, into a memory 316 (which may form part of one or more of the components shown in FIG. 1). In another embodiment, a copy of the data in the database 306 may be provided and maintained in a central computer system (not shown) that may be accessible by the CSS signal generator 302. In yet another embodiment, the data in the database 306 (or portions thereof) may be updated during the control session or pre-flight routine from the central computer system.

The CSS interface system 300 includes the system controller 308 that provides overall control of the interface operations to/from the electronic device 108 in order to allow the remote control of the cabin services 104. The system controller 308 controls the communication and generation of the various signals commands, such as when the CSS generator 302 accesses the database 306, for example, defining an address into the database 306 where the data and information necessary for the image generator CSS generator 302 to generate control signals is stored. Communication between the various components illustrated in FIG. 3 may be provided via a wide band communication link, such as, for example, an Ethernet type communication bus or, in some embodiments, via a wireless communication link.

Accordingly, the CSS interface system 300 allows a user's device, such as the electronic device 108 to connect to and control cabin services 104 (e.g., one or more cabin service features). By accessing the user interface 304, the passenger 106 is able to remotely control the cabin services 104 from the passenger seats 114 (e.g., while seated in one of the passenger seats 114).

Figure 3:
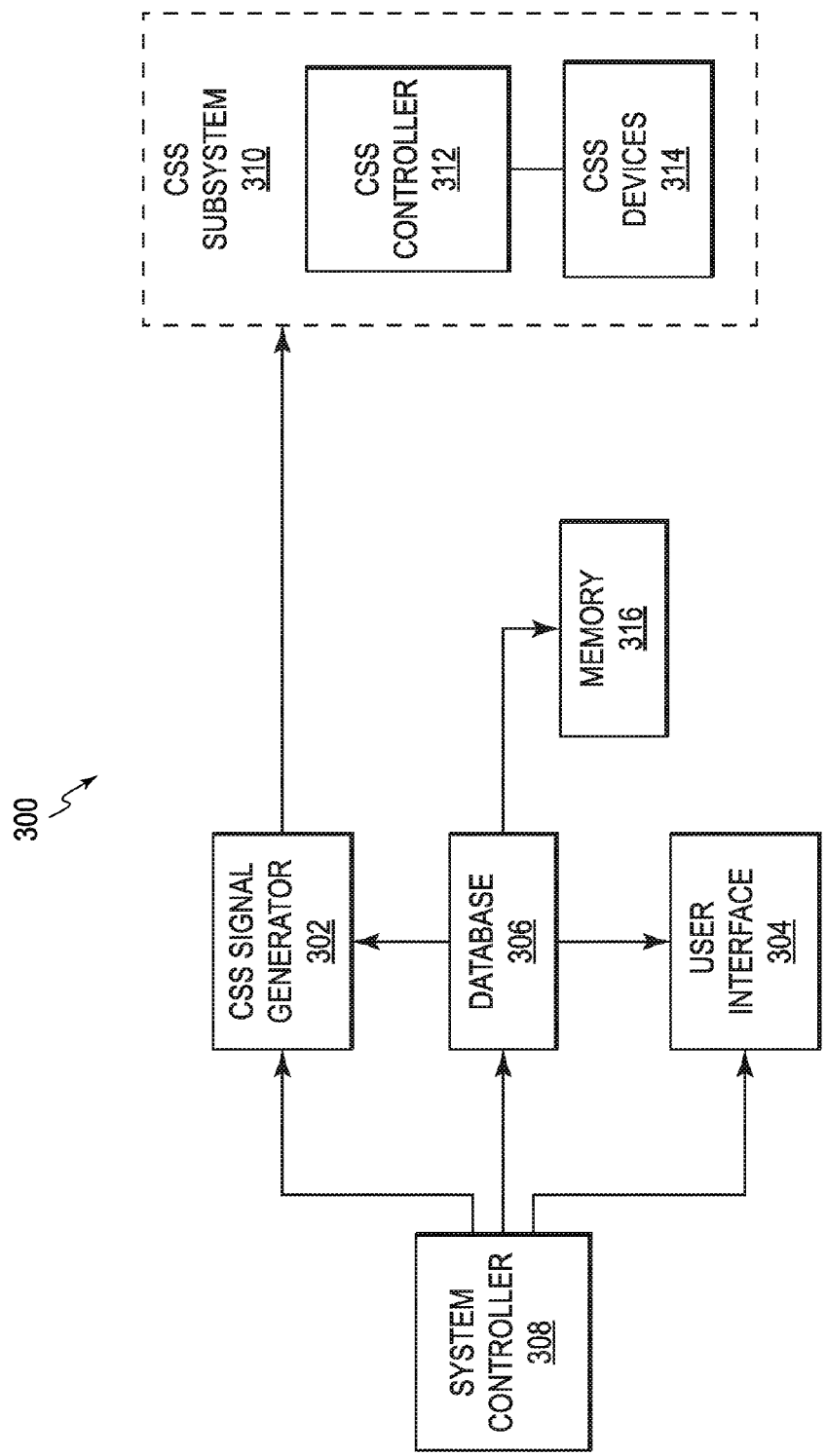
FIG. 3 is a block diagram of an interface system in accordance with an embodiment.

One configuration of a control arrangement 400 that allows for the user devices to interface with and control cabin services 104 is shown in FIG. 4 (with reference also to FIGS. 1-3). In this embodiment, a passenger seated in one of the seats 404 is able to control one or more CSS devices, illustrated as a reading light (RL) 406, a call light (CL) 408 and an air vent (Gasper) 410 using a PED 412. In this embodiment, each passenger seat 404 is identified using a unique QR code ID 414 associated with each of the passenger seats 404 (which may be provided, for example, on a placard, label, marker or picture mounted to the seat 404). The CSS system 402 includes different control components or modules, such as a cabin services management unit (CSMU) 422 that is configured as a head-in box that allows for communication with the other systems on-board the aircraft. It should be noted that one or more control inputs (e.g., manual buttons) may also be provided in connection with the cabin services 104, such as one or more physical buttons above the passenger seats 404 to operate the reading light (RL) 406, the call light (CL) 408 and the air vent (Gasper) 410. Thus, the cabin services 104 in various embodiments are controllable remotely or manually.

In the illustrated embodiment, a wireless access point (WAP) 416 allows wireless communication between the PED 412 and the CSS system 402. It should be noted that multiple WAPs 416 may be provided throughout the aircraft that allow the PED 412 to communicate wirelessly to the CSS system 402 via a connectivity server 418. For example, in one embodiment, the connectivity server 418 is a wireless router communicating with the WAPs 416 and bundles received inputs into a single communication channel or pipe. The connectivity server 418 allows communication and access to the CSS system 402, and in various embodiments, includes firewall and other data communication security features. It should be noted that the connectivity server 418 in some embodiments communicates with a ground system or station, such as via an antenna. It should also be noted that the CSS system 402 is configured to prevent any communication with the aircraft control systems. Thus, the PED 412 cannot communicate with and operate aircraft controls. For example, in some embodiments, the CSS system 402 allows only one-way communication to the flight deck.

The control arrangement 400 also includes an on-board mobile telephone system (OMTS) 420 that may be configured to communicate with the PED 412. For example, if the PED 412 is a mobile telephone, the OMTS 420 allows voice communications from the PED 412. The control arrangement 400 includes a drive module (SDM) 424 that generates a sound (e.g., chime) when one or the CLs 408 is activated. An overhead electronic unit (OEU) 426, which may be form part of or be embodied as the CSS controller 312 (illustrated in FIG. 3), converts the digital signals (e.g., decodes received digital signals) to physical control signals (e.g., analog signals or CSS device control signals) for turning on and off, for example, the RLs 406. A master call light (MLC) 428 is also provided as part of the CSS system 402.

One or more zone management units (ZMUs) 430 are configured as local routers that direct data to control the proper CSS devices 314, such as the reading light (RL) 406, the call light (CL) 408 and the air vent (Gasper) 410. For example, the ZMUs 430 communicate the translated and/or converted control signals along the appropriate data path(s) 432, such as to an overhead control unit that control the reading light (RL) 406, the call light (CL) 408 and the air vent (Gasper) 410. In the illustrated embodiment, overhead electronic units (OEUs) 434 are provided and configured to convert the signals received from the PED 412 and translated by the CSS interface system 300 from digital signals to physical control signals to operate the reading light (RL) 406, the call light (CL) 408 and the air vent (Gasper) 410 based on commands input at the PED 412. Additionally, one or more power paths to power the various components, including the reading light (RL) 406, the call light (CL) 408 and the air vent (Gasper) 410 are provided.

As can be seen in FIG. 4, with the control arrangement 400, no individual wiring to each of the passenger seats 404 is needed to allow for communication with the CSS system 402 to control the reading light (RL) 406, the call light (CL) 408 and the air vent (Gasper) 410. It should be noted that other cabin services 104 may be controlled with the control arrangement 400, including any cabin services features that may be available in the particular aircraft.

In operation, the QR code ID 414 is used by the control arrangement 400 to identify the passenger seat 404 from which the PED 412 is transmitting a control command. The control arrangement 400 is used to assign an Internet Protocol (IP) address for the PED 412 held by the passenger 106 in the corresponding passenger seat 404 to communicate with the CSS system 402 via the CSS interface system 300. In various embodiments, the QR code ID 414 is used to prevent one passenger from controlling cabin services 104 associated with other passengers. For example, using the QR code ID 414, the CSS interface system 300 identifies the reading light (RL) 406, the call light (CL) 408 and the air vent (Gasper) 410 associated with the passenger seat 404 (e.g., above the passenger seat 404). In various embodiments, the database 306 stores the QR code ID 414 corresponding to each of the reading light (RL) 406, the call light (CL) 408 and the air vent (Gasper) 410. It should be noted that in addition to the QR code ID 414, other information may be used to confirm that the PED 412 is allowed access to the CSS system 402, such as with the flight number (e.g., confirming that the PED 412 is located on the aircraft corresponding to the flight number using a signal strength determination or location services for the PED 412). In some embodiments, the QR code ID 414 may be used to identify a row of passenger seats 404 or other locations in the aircraft.

Figure 5:
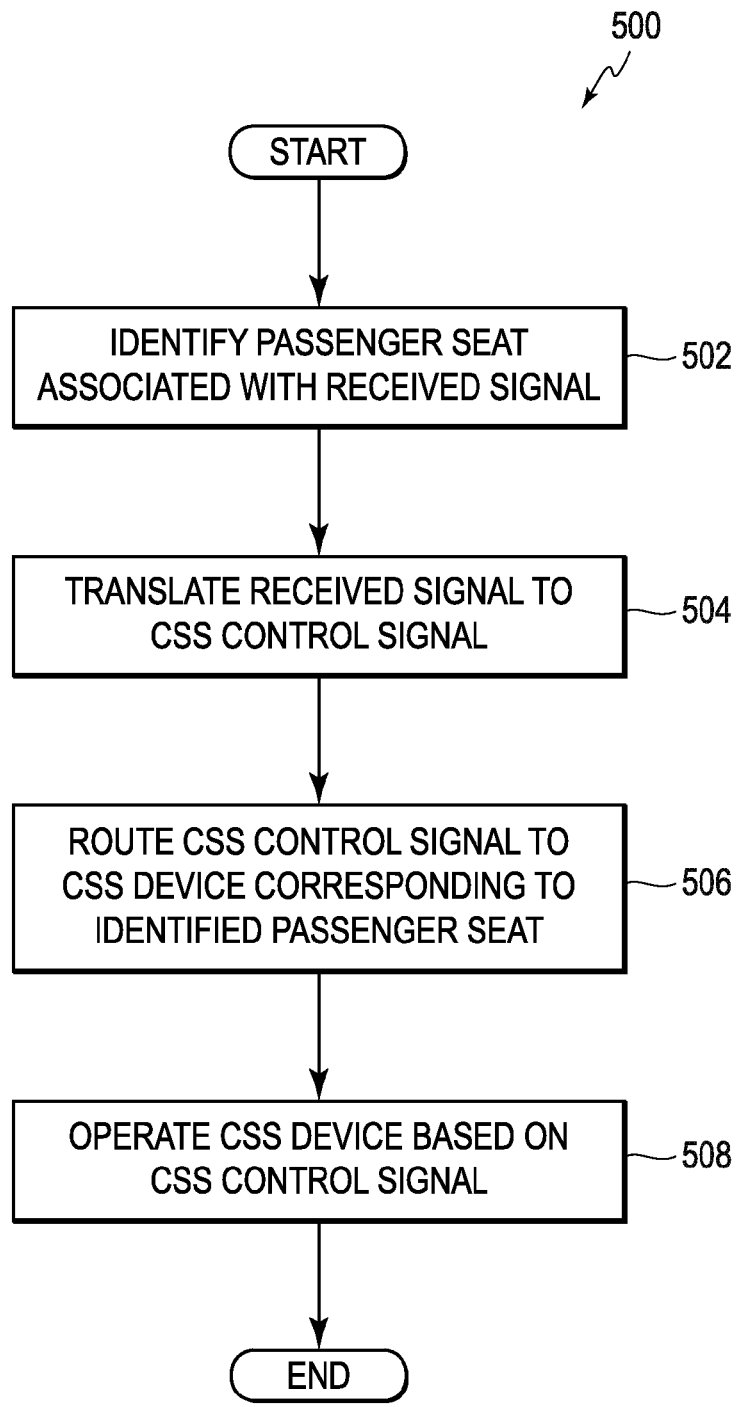
FIG. 5 is a block diagram of a method for remotely controlling cabin services in accordance with an embodiment.

A method 500 for remotely controlling cabin services, such as from a PED is illustrated in FIG. 5. It should be appreciated that the method 500 may be implemented by one or more the embodiments disclosed herein, which may be combined or modified as desired or needed. Additionally, the steps in the method 500 may be modified, changed in order, performed differently, performed sequentially, concurrently or simultaneously, or otherwise modified as desired or needed.

The method 500 includes identifying a passenger seat associated with a received signal at 502. For example, based on a seat identifier that may be automatically determined or entered by a user via a user interface as described herein, the seat location of the device that communicated the signal is identified. Thus, at 502 a determination is made as to which seat within an aircraft a passenger is seated that desires to control one or more cabin services using his or her PED. In various embodiments, the signal communicated by the PED using a wireless communication protocol (e.g., WiFi communication protocol) includes a bit packet message that is used to determine a desired control operation (e.g., cabin services command). For example, a specialized bit pattern defining a control command in an aircraft is transmitted from the PED. In some embodiments, the bit packet message includes an Ethernet header with one or more bits that identify the seat from which the data is being transmitted (which may include an application ID corresponding to the application running on the PED). The bit packet message may further include packet data that defines one or more attributes that control a cabin service function (that are defined in a database). For example, a set of attributes (e.g., sequential code numbers) may be used to turn on a light, turn off a light or toggle a light. Thus, in various embodiments, whether the received data is used to control cabin services is based on how the data looks regardless of who is sending the data.

In some embodiments, the method 500 confirms that the signal is received from within the aircraft as described herein. Moreover, the application on the PED may only be valid for the particular flight (such as based on the scheduled time of the flight). In some embodiments, the received signal is validated, such as using a cyclic redundancy check (CRC) or checksum method.

The method 500 also includes translating the received signal to a CSS control signal at 504. For example, after the signal is confirmed as a valid signal for controlling one or more cabin services for the particular flight, the method 500 translates the specialized bit pattern in the data packet to a CSS control signal as described herein that then may be used to control one or more cabin services. The translated signal, which is now in a format or protocol that can be used to control the cabin service(s) is routed at 506 to the CSS device (e.g., overhead light) corresponding to the identified passenger seat. For example, based on a QR code ID, the CSS control signal is communicated to an overhead control unit associated with a CSS device above the identified seat as described herein. Thus, in various embodiments, the control signal is routed to the cabin services located above the passenger that desires control of the cabin services.

The method 500 also includes operating the CSS device based on the control signal at 508. The control signal may turn on or off a particular cabin service associated with the selected attribute as described herein. For example, the reading light above seat 24A may be turned on based on the selected attribute that is controlled by the CSS signal.

Thus, various embodiments allow remote control of cabin services from a passenger seat within an aircraft.

The various embodiments may be implemented in connection with different computing systems. Thus, while a particular computing or operating environment may be described herein, the computing or operating environment is intended to illustrate operations or processes that may be implemented, performed, and/or applied to a variety of different computing or operating environments.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 6:
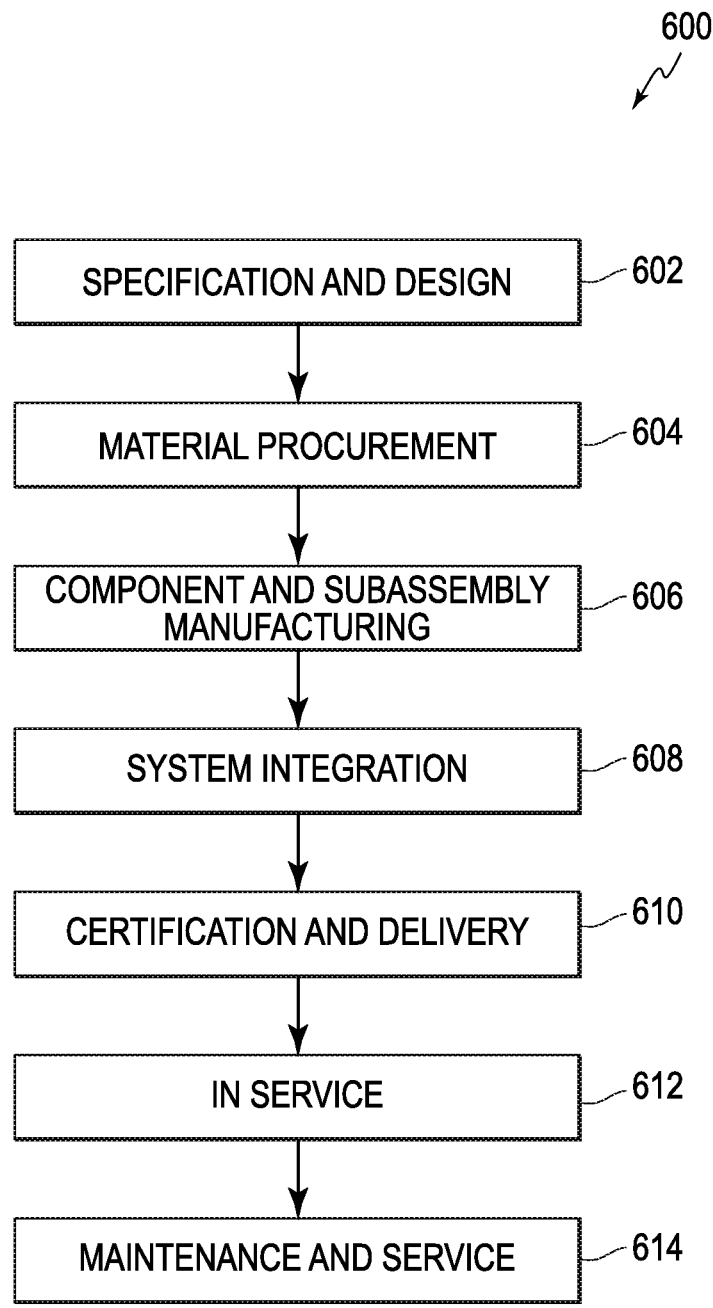
FIG. 6 is a block diagram of aircraft production and service methodology.
Figure 7:
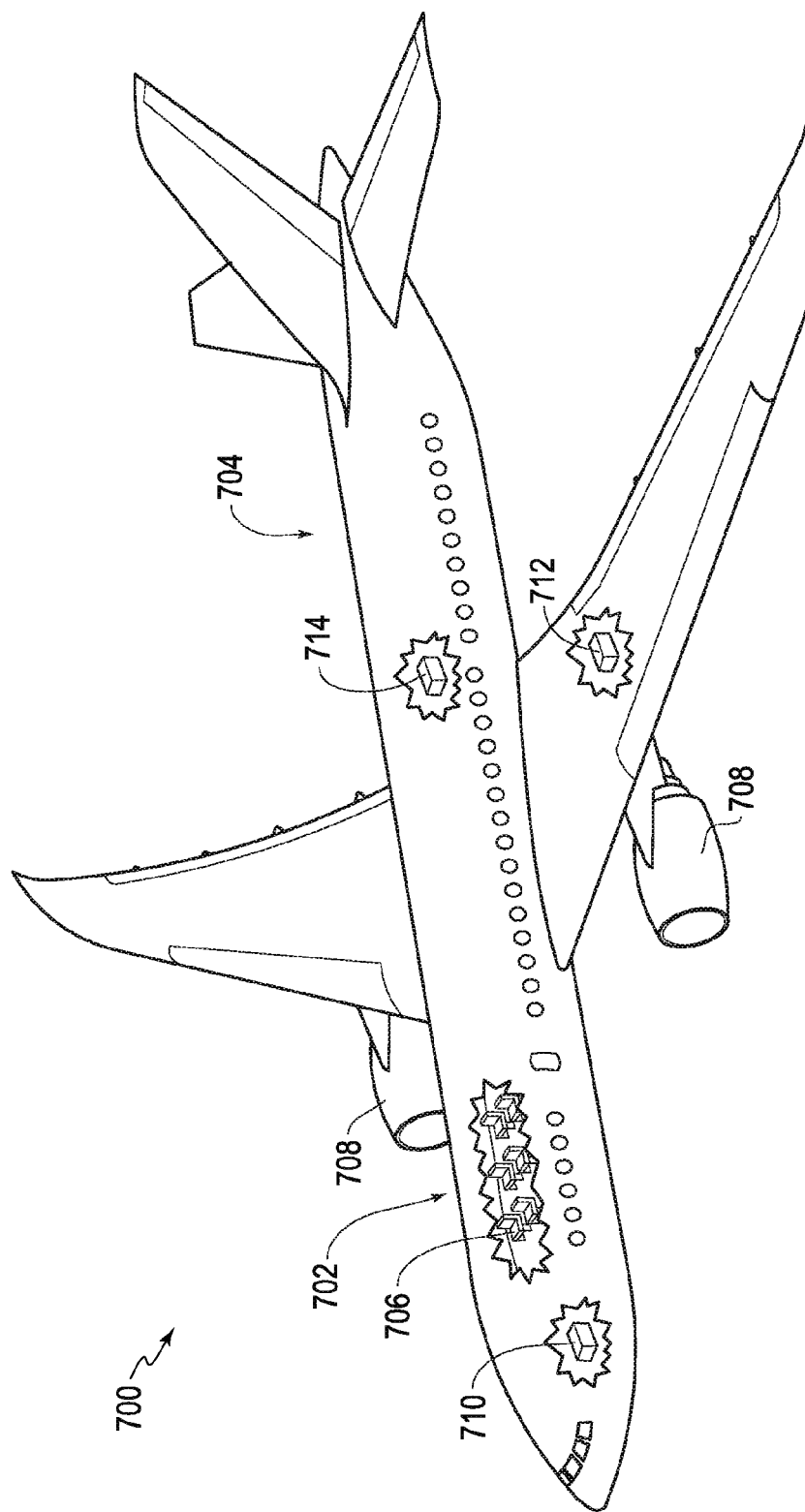
FIG. 7 is a schematic perspective view of an aircraft.

Examples of the disclosure may be described in the context of an aircraft manufacturing and service method 600 as shown in FIG. 6 and an aircraft 700 as shown in FIG. 7. During pre-production, illustrative method 600 may include specification and design 602 of the aircraft 700 and material procurement 604. During production, component and subassembly manufacturing 606 and system integration 608 of the aircraft 700 take place. Thereafter, the aircraft 700 may go through certification and delivery 610 to be placed in service 612. While in service by a customer, the aircraft 700 is scheduled for routine maintenance and service 614 (which may also include modification, reconfiguration, refurbishment, and so on).

Each of the processes of the illustrative method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 7, the aircraft 700 produced by the illustrative method 600 may include an airframe 702 with a plurality of high-level systems 704 and an interior 706. Examples of high-level systems 704 include one or more of a propulsion system 708, an electrical system 710, a hydraulic system 712, and an environmental system 714. Any number of other systems may be included. Although an aerospace example is shown, the principles may be applied to other industries, such as the automotive industry.

Apparatus and methods shown or described herein may be employed during any one or more of the stages of the manufacturing and service method 600. For example, components or subassemblies corresponding to component and subassembly manufacturing 606 may be fabricated or manufactured in a manner similar to components or subassemblies produced while the aircraft 700 is in service. Also, one or more aspects of the apparatus, method, or combination thereof may be utilized during the production states 606 and 608, for example, by substantially expediting assembly of or reducing the cost of an aircraft 700. Similarly, one or more aspects of the apparatus or method realizations, or a combination thereof, may be utilized, for example and without limitation, while the aircraft 700 is in service, e.g., maintenance and service 614.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as an optical disk drive, and the like. The storage device may also be other similar means for loading computer programs or other instructions into the computer or processor.

As used herein, the terms "system," "subsystem," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more FPGAs, application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A system comprising:
a receiver configured to receive a message from a portable electronic device; and
a controller communicatively coupled to the receiver, the controller configured to:
identify a location within an aircraft cabin, the location associated with the portable electronic device based on the message;
identify a command based on the message;
comparing a time associated with the message with a flight time associated with the message; and
responsive to the time being within the flight time, generate a control signal based on the location and the command.

2. The system of claim 1, wherein the command corresponds to adjusting a power state of a reading light, activating a call button, adjusting an air vent, or a combination thereof.

3. The system of claim 1, further comprising a plurality of zone management units, wherein a first zone management unit of the plurality of zone management units is associated with a plurality of locations within the aircraft cabin including the location, wherein a second zone management unit of the plurality of zone management units is associated with a second plurality of locations within the aircraft cabin, and wherein the first zone management unit is configured to route the control signal to a particular device associated with the location and the command.

4. The system of claim 1, wherein the message comprises first data encoded in a digital format, and wherein the control signal corresponds to second data encoded in an analog format.

5. The system of claim 1, wherein the message comprises an Ethernet header.

6. The system of claim 1, wherein the receiver is a WiFi receiver.

7. The system of claim 1, further comprising a cabin service system, wherein the cabin service system is configured to:
receive the control signal from the controller;
identify a particular cabin system associated with the command; and
initiate performance of the command via the particular cabin system at the location.

8. The system of claim 7, further comprising a physical switch associated with the location and the particular cabin system, wherein the cabin service system is configured to initiate performance of the command responsive to a state change at the physical switch.

9. The system of claim 1, further comprising a database storing conversion information, wherein the controller is configured to access the conversion information to generate the control signal.

10. A method comprising:
receiving a message from a portable electronic device;
identifying a location within an aircraft cabin, the location associated with the portable electronic device based on the message;
identifying a command based on the message;
comparing a time associated with the message with a flight time associated with the message; and
responsive to the time being within the flight time, generating a control signal based on the location and the command.

11. The method of claim 10, further comprising:
receiving a second message from a second portable electronic device distinct from the portable electronic device;
identifying a second location within the aircraft cabin, the second location associated with the second portable electronic device based on the second message, wherein the second location is distinct from the location;
identifying a second command based on the second message, wherein the command is associated with a first cabin system distinct from a second cabin system associated with the second command; and
generating a second control signal based on the second location and the second command.

12. The method of claim 10, wherein the flight time corresponds to a scheduled time of a flight identified by the message.

13. The method of claim 10, further comprising:
receiving a second message from the portable electronic device;
comparing a second time associated with the second message with the flight time, wherein the flight time is associated with the second message; and
responsive to the second time not being within the flight time, identifying the second message as invalid.

14. A computer-readable storage device storing instructions that, when executed by a processor, cause the processor to perform operations comprising:
receiving a message from a portable electronic device;
identifying a location within an aircraft cabin, the location associated with the portable electronic device based on the message;
identifying a command based on the message;
comparing a time associated with the message with a flight time associated with the message; and
responsive to the time being within the flight time, generating a control signal based on the location and the command.

15. The computer-readable storage device of claim 14, wherein the operations further comprise, prior to receiving the message, initiating transmission of an application to the portable electronic device, wherein the application is configured to generate the message, wherein the message is received via a transceiver, and wherein the application is transmitted via the transceiver.

16. The computer-readable storage device of claim 14, wherein the operations further comprise, prior to receiving the message, assigning an Internet Protocol address to the portable electronic device.

17. The computer-readable storage device of claim 14, wherein the message includes an identifier, and wherein the location is identified based on the identifier.

18. The computer-readable storage device of claim 17, wherein the identifier corresponds to a seat number, and wherein the location corresponds to an aircraft seat identified by the seat number.

19. The computer-readable storage device of claim 17, wherein the identifier corresponds to a Quick Response code, and wherein the Quick Response code expires after a period of time corresponding to the flight time.

20. The computer-readable storage device of claim 17, wherein the identifier corresponds to a passenger name, and wherein the location corresponds to a seat associated with the passenger name.

* * * * *